(12) United States Patent
Tachihara

(10) Patent No.: US 7,350,100 B2
(45) Date of Patent: Mar. 25, 2008

(54) METHOD AND APPARATUS FOR MONITORING DATA-PROCESSING SYSTEM

(75) Inventor: Hidekazu Tachihara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 488 days.

(21) Appl. No.: 10/838,232

(22) Filed: May 5, 2004

(65) Prior Publication Data

US 2005/0022190 A1    Jan. 27, 2005

(30) Foreign Application Priority Data

Jul. 10, 2003    (JP) ............................. 2003-194994

(51) Int. Cl.
*G06F 11/00*    (2006.01)
(52) U.S. Cl. .......................................... 714/4; 718/103
(58) Field of Classification Search .................. 714/57, 714/4, 5, 7; 718/103; 700/100, 103, 1, 110
See application file for complete search history.

(56) References Cited

U.S. PATENT DOCUMENTS

| | | | | |
|---|---|---|---|---|
| 5,878,302 | A * | 3/1999 | Inui et al. ...................... | 399/81 |
| 6,112,243 | A * | 8/2000 | Downs et al. ............... | 709/226 |
| 6,665,716 | B1 * | 12/2003 | Hirata et al. ................. | 709/224 |
| 7,139,629 | B2 * | 11/2006 | Fromherz et al. ........... | 700/100 |
| 2004/0001215 | A1 * | 1/2004 | Kurotsu ...................... | 358/1.13 |
| 2004/0078628 | A1 * | 4/2004 | Akamatu et al. .............. | 714/4 |
| 2004/0225394 | A1 * | 11/2004 | Fromherz et al. ........... | 700/101 |
| 2004/0250249 | A1 * | 12/2004 | Fukunari et al. ............ | 718/100 |
| 2004/0260668 | A1 * | 12/2004 | Bradford ....................... | 707/1 |
| 2005/0010608 | A1 * | 1/2005 | Horikawa .................... | 707/200 |
| 2005/0096957 | A1 * | 5/2005 | Bayoumi et al. .............. | 705/8 |
| 2005/0144234 | A1 * | 6/2005 | Tanaka et al. .............. | 709/205 |

FOREIGN PATENT DOCUMENTS

| | | |
|---|---|---|
| JP | 10-63539 | 3/1998 |
| JP | 10-83382 | 3/1998 |

* cited by examiner

*Primary Examiner*—Robert Beausoliel
*Assistant Examiner*—Christopher McCarthy
(74) *Attorney, Agent, or Firm*—Antonelli, Terry, Stout & Kraus, LLP.

(57) ABSTRACT

A system management method and apparatus presents in real time an importance level of a job affected by a failure in distributed systems to make it possible to quickly deal with the failure and minimize business losses. The apparatus includes an integrated management unit (IMU) monitoring the distributed systems, a job influence manager which manages as predetermined information relations between jobs executed on the distributed systems and resources making up the jobs and which, in response to a query from the IMU, sends back information on the jobs affected by the failure event. The apparatus includes an importance level manager which calculates importance levels of individual jobs according to predetermined rules and evaluation formulas and sends back a job importance level in response to a request from the IMU. The event and the importance level of the job affected by the event is displayed in the IMU.

24 Claims, 13 Drawing Sheets

FIG. 1

| JOB IMPORTANCE LEVEL | TIME OF OCCURRENCE | EVENT MESSAGE |
|---|---|---|
| B | 2003/1/17/10:25 | APPLICATION 06 ABNORMALLY EXITED |
| C | 2003/1/17/10:26 | MEMORY UTILIZATION OF SERVER 08 EXCEEDED 95% |
| A | 2003/1/17/10:28 | RESPONSE OF APPLICATION 03 DEGRADED |
| B | 2003/1/17/10:29 | VIRUS WAS DETECTED IN SERVER 07 |
| C | 2003/1/17/10:31 | ACCESS TO DISK 05 FAILED |
| ... | ... | ... |

FIG. 3

| | JOB NAME | JOB IMPORTANCE LEVEL | |
|---|---|---|---|
| 300 | | | 301 |
| 310 | INTERNET SALES SITE A | A | 311 |
| | INTERNET SALES SITE B | B | |
| | INTERNET SALES SITE C | C | |
| 325 | PRODUCT A PRODUCTION CONTROL SYSTEM | C | |
| | PRODUCT B PRODUCTION CONTROL SYSTEM | A | |
| | PRODUCT C PRODUCTION CONTROL SYSTEM | B | |
| 340 | WEB SITE FOR CUSTOMERS | A | |
| 345 | WEB SITE FOR EMPLOYEES | B | |
| 350 | WORK DAY/HOLIDAY MANAGEMENT SYSTEM | C | |
| 355 | SALARY CALCULATION SYSTEM | A | |

FIG. 4

| JOB NAME | TABLE NO | NUMBER OF EVALUATION ITEMS |
|---|---|---|
| INTERNET SALES SITE A | 1 | 3 |
| INTERNET SALES SITE B | 1 | 3 |
| INTERNET SALES SITE C | 1 | 3 |
| PRODUCT A PRODUCTION CONTROL SYSTEM | 2 | 2 |
| PRODUCT B PRODUCTION CONTROL SYSTEM | 2 | 2 |
| PRODUCT C PRODUCTION CONTROL SYSTEM | 2 | 2 |
| WEB SITE FOR CUSTOMERS | 3 | 2 |
| WEB SITE FOR EMPLOYEES | 3 | 2 |
| WORK DAY/HOLIDAY MANAGEMENT SYSTEM | 3 | 2 |
| SALARY CALCULATION SYSTEM | 3 | 2 |

FIG. 5

⟨TABLE 1⟩ 500

| JOB NAME | MONTHLY SALES (YEN)⟨P11⟩ | CAMPAIGN PERIOD⟨P12⟩ | SALES RATE DURING(%)⟨P13⟩ |
|---|---|---|---|
| INTERNET SALES SITE A | 50,000,000 | 12/1~12/24 | 30 |
| INTERNET SALES SITE B | 1,000,000 | 6/1~6/20 | 50 |
| INTERNET SALES SITE C | 300,000 | | 0 |

⟨TABLE 2⟩

| JOB NAME | NUMBER OF STORED GOODS (PIECES)⟨P21⟩ | MINIMUM NUMBER OF STORED GOODS(PIECES)⟨P22⟩ |
|---|---|---|
| PRODUCT A PRODUCTION CONTROL SYSTEM | var_1 | 10 |
| PRODUCT B PRODUCTION CONTROL SYSTEM | var_2 | 20 |
| PRODUCT C PRODUCTION CONTROL SYSTEM | va_3 | 30 |

⟨TABLE 3⟩

| JOB NAME | FOCUSED PERIOD ⟨P31⟩ | CONFIDENCE LOSS PERCENTAGE (%)⟨P32⟩ |
|---|---|---|
| WEB SITE FOR CUSTOMERS | EVERY DAY | 80 |
| WEB SITE FOR EMPLOYEES | MONDAY-FRIDAY | 20 |
| WORK DAY/HOLIDAY MANAGEMENT SYSTEM | 25TH-31ST EVERY MONTH | 30 |
| SALARY CALCULATION SYSTEM | 20TH-31ST EVERY MONTH | 60 |

FIG. 6

| VARIABLE NAME | LOCATION OF DATA |
|---|---|
| var_1 | server_K¥seisan¥seihin_A.db |
| var_2 | server_K¥seisan¥seihin_B.db |
| var_3 | server_K¥seisan¥seihin_C.db |

FIG. 7

JOB IMPORTANCE LEVEL F1(P11,P12,P13)

$$= \begin{cases} A \begin{bmatrix} \text{for}[(10,000,000) \leq P11] \cup \\ \{(P11 < 10,000,000) \cap (DATE \in P12) \cap (40 \leq P13)\}] \end{bmatrix} \\ B \begin{bmatrix} \text{for}[(1,000,000) \leq P11 < 10,000,000) \cup \\ \{(P11 < 1,000,000) \cap (DATE \in P12) \cap (20 \leq P13 < 40)\}] \end{bmatrix} \\ C \quad (\text{for}\{(P11 < 1,000,000) \cup (DATE \notin P12) \cup (P13 < 20)\}) \end{cases}$$

$$\text{------------------------ (1)}$$

JOB IMPORTANCE LEVEL F2(P21,P22)

$$= \begin{cases} A & (\text{for}(P21 < P22)) \\ B & (\text{for}(P22 \leq P21 < P22 \times 1.2)) \\ C & (\text{for}(P22 \times 1.2 \leq P21)) \end{cases}$$

$$\text{------------------------ (2)}$$

JOB IMPORTANCE LEVEL F3(P31,P32)

$$= \begin{cases} A & (\text{for}[(70 \leq P32) \cup \{(DATE \in P31) \cap (40 \leq P32 < 70)\}]) \\ B \begin{bmatrix} (\text{for}[\{(DATE \notin P31) \cap (40 \leq P32 < 70)\} \cup \\ \{(DATE \in P31) \cap (P32 < 40)\}] \end{bmatrix} \\ C & (\text{for}[\{(DATE \notin P31) \cap (P32 < 40)\}]) \end{cases}$$

$$\text{------------------------ (3)}$$

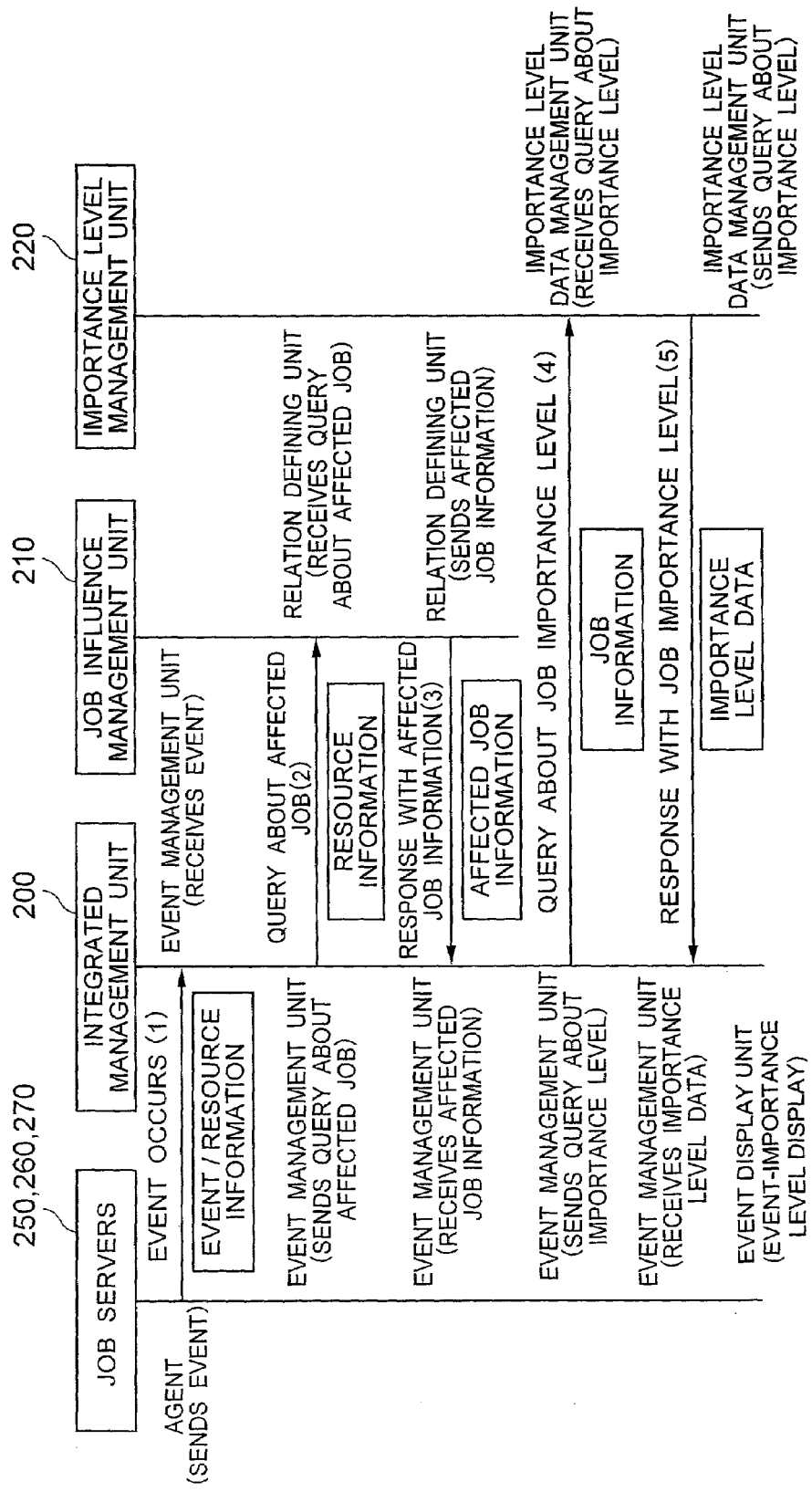

FIG.10

| IMPORTANCE LEVEL | TIME OF OCCURRENCE | EVENT MESSAGE |
|---|---|---|
| CRITICAL | 2003/1/17 10:25 | APPLICATION 06 ABNORMALLY EXITED |
| FATAL | 2003/1/17 10:26 | MEMORY UTILIZATION OF SERVER 08 EXCEEDED 95% |
| WARNING | 2003/1/17 10:28 | RESPONSE OF APPLICATION 03 DEGRADED |
| FATAL | 2003/1/17 10:29 | VIRUS WAS DETECTED IN SERVER 07 |
| WARNING | 2003/1/17 10:31 | ACCESS TO DISK 05 FAILED |
| ... | ... | ... |

FIG.11

| EVENT ITEM | WARNING 1101 | CRITICAL 1102 | FATAL 1103 |
|---|---|---|---|
| CPU UTILIZATION | 70%-80% | 80%-90% | 90% OR HIGHER |
| MEMORY UTILIZATION | 75%-85% | 85%-95% | 95% OR HIGHER |
| DISK UTILIZATION | 75%-85% | 85%-90% | 90% OR HIGHER |
| SERVER | RESPONSE DEGRADED | EXITED ABNORMALLY | ... |
| APPLICATION | RESPONSE DEGRADED | EXITED ABNORMALLY | ... |
| ... | ... | ... | ... |

METHOD AND APPARATUS FOR MONITORING DATA-PROCESSING SYSTEM

INCORPORATION BY REFERENCE

This application claims priority from Japanese Patent Application JP 2003-194994 filed on Jul. 10, 2003, the content of which is hereby incorporated by reference into this application.

BACKGROUND OF THE INVENTION

The present invention relates to a system management method and apparatus for a distributed computing system and more particularly to a system management technique for a distributed computing system that enables levels of importance of each business operation on a computing system (simply referred to as a job) to be utilized in the system management.

As the Internet use has spread rapidly and the computer performances have shown a significant progress in recent years, computers and their peripheral devices have come into widespread use in corporations and a growing number of business operations are being transacted on a computing system. Under these circumstances, failures or troubles that occur on the computing system have significant effects on their business in every corporation and it is now a great concern for each corporation to operate and manage efficiently and securely their distributed computing system (hereinafter referred to simply as a distributed system) distributed over an entire organization of the corporation.

A distributed system such as described above has generally been managed by using an integrated systems management (simply referred to as a system management) product. The conventional technique involves installing monitoring software called agent to keep track of objects being monitored, such as business servers, on the distributed system and displaying information on occurrence of failures and abnormal conditions (simply referred to as events) on an event console in a center for supervision.

There is known a conventional technique to determine the level of importance of a job as seen from a user of the distributed system, such as one disclosed in JP-A-10-83382. This conventional technique is designed to predict a future trend of constitutional elements of a job from the standpoint of system maintenance so that necessary steps can be taken before a failure occurs, such as adding memory and disk. This technique, however, does not consider how to deal with the current existing failures in the distributed system.

Another prior art is disclosed in JP-A-10-63539 for instance. This technique attempts to reduce the time it takes to deal with a large number of events occurring every minute by automatically classifying or ranking them according to their importance and content. The level of importance or urgency considered in this prior art, however, represents a severity of a trouble with system resources but does not take into account which job will be affected by that trouble, the significance of the affected job and the effect the halted job will have on the business of a corporation.

SUMMARY OF THE INVENTION

As described above, the conventional system management method for a distributed computing system has not yet advanced as far as implying an introduction of a priority order in dealing with failures that takes into account the importance of each job realized on the system as seen from the business point of view.

In the event that two or more failures occur almost simultaneously, the conventional system management method cannot minimize the business losses.

An object of this invention is to provide a system management method and apparatus for a distributed computing system which solves the aforementioned problems experienced with the prior art technology and which not only identifies a range of the system affected by a failure but also presents to a system administrator in real time how important the affected job is so that even an untrained person without as much understanding of business as a system administrator is expected to have can swiftly execute the system management of the distributed system to minimize business losses.

The above object of the invention can be realized by a system management method in a system management apparatus for a distributed computing system having a plurality of computers, the system management method comprising the steps of: managing relations between jobs executed by the computers and system resources used by the jobs, information on jobs associated with a system resource failure, and information on importance levels of the jobs; and in the event of the system resource failure, displaying information on the system resource failure and information on an importance level of a job associated with the system resource failure.

The above object of the invention can also be realized by a system management apparatus for a distributed computing system having a plurality of computers, the system management apparatus comprising: an integrated management unit with monitors an entire system and displays an event message about information on system resource failures transmitted from computers that are executing jobs; a job-influence management unit which manages as a predetermined specification relations between jobs executed on the distributed computing system and system resources used by the jobs and, in response to a query from the integrated management unit, presents information on the job associated with the system resource failure; and an importance level management unit which calculates a job importance level considering business losses caused by a halt of the job according to predetermined rules and, in response to a query from the integrated management unit, presents job importance level information.

Other objects, features and advantages of the invention will become apparent from the following description of the embodiments of the invention taken in conjunction with the accompanying drawings.

BRIEF DESCRIPTION OF THE DRAWING

FIG. 1 illustrates an example display on the event console according to the distributed system management method according to one embodiment of this invention.

FIG. 3 is a table showing example data on job importance level stored in a job importance level database.

FIG. 4 illustrates a rule table defining table.

FIG. 5 illustrates a configuration of a rule table.

FIG. 6 illustrates a table of locations where latest variables are stored.

FIG. 7 illustrates example formulas for defining job importance levels.

FIG. 8 illustrates a sequence of processing executed from the occurrence of an event in a business server to the displaying of the event along with the job importance level.

FIG. 10 illustrates an example display on the event console which the inventor has considered.

FIG. 11 illustrates an example definition of criterion to determine an importance level of each event which the inventor has considered.

DESCRIPTION OF THE EMBODIMENTS

Figure 2:
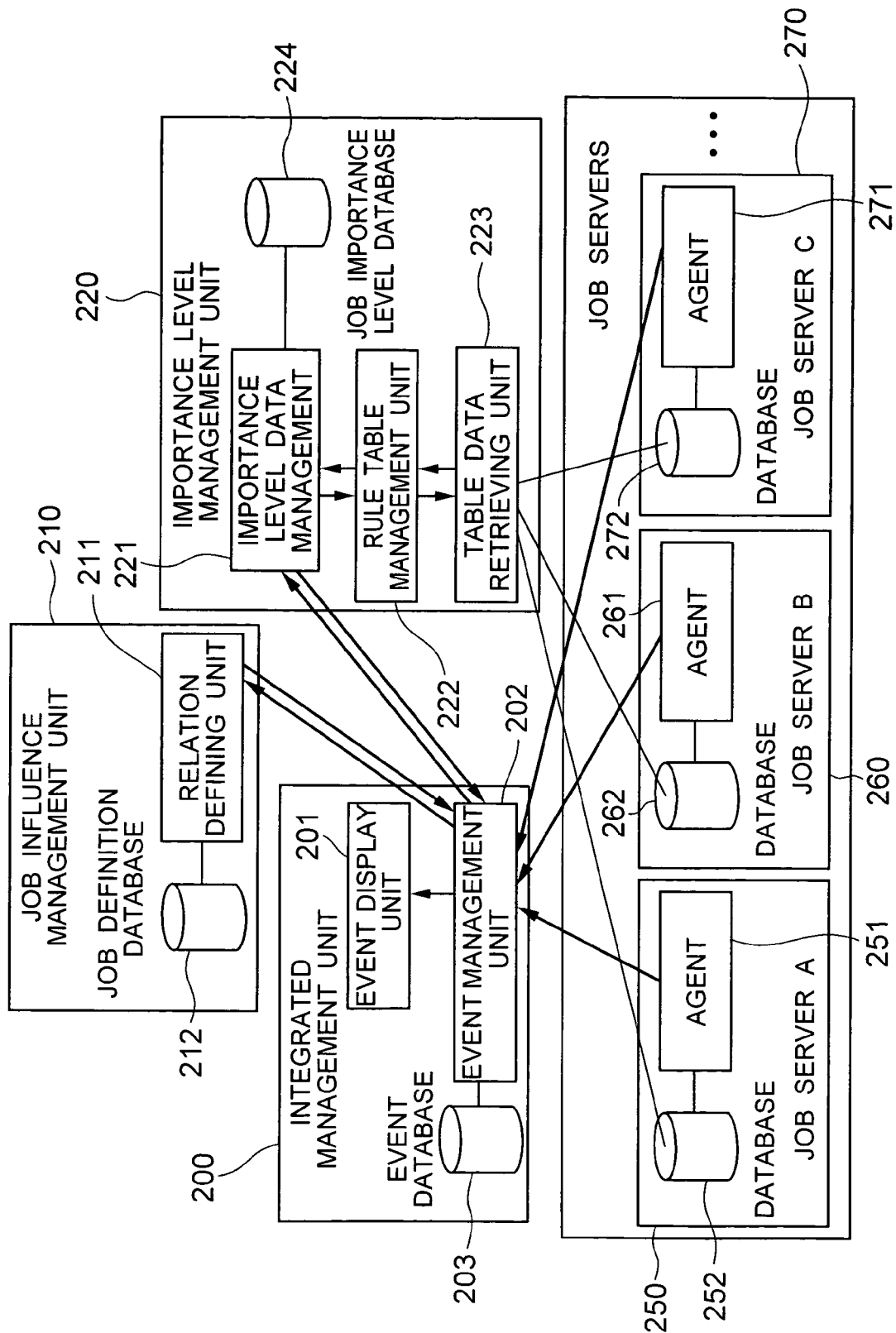
FIG. 2 is a block diagram showing a configuration of a distributed system to which the distributed system management method of one embodiment of this invention is applied.

Prior to describing the embodiments of the invention, explanation will be made of the art which the inventor considered by himself before achieving the invention by referring to FIGS. 10-13 only for easy understanding. Therefore, the explanation should not be considered as prior art in the statutes.

FIG. 10 shows an example display of an event console which the present inventor has considered. FIG. 11 shows an example definition of a criterion for determining a level of urgency or importance.

The event console displays information such as shown in FIG. 10. The information displayed is a record for each event which includes an importance of an event 1000, a time of event occurrence 1001 and an event message 1002. The importance 1000 represents an urgency or importance of a failure as an event, the time of occurrence 1001 is the time at which the event occurred, and the event message 1002 represents a content of the event. For example, a record in a second row of FIG. 10 indicates that an event 1022 of a memory utilization of server 08 exceeding 95% occurred at 10:26 on Jan. 17, 2003 (1021) and that the importance of the event is "fatal" (1020).

The importance of an event is normally classed into multiple levels, such as "warning," "critical" and "fatal," and is defined for each event as shown in FIG. 11. An example definition shown here consists of an event item 1100, warning 1101, critical 1102 and fatal 1103. The event item includes a CPU utilization, a memory utilization, a disk utilization, server and application. For each of these items, one of the importance levels—warning 1101, critical 1102 and fatal 1103—is determined. For example, in the disk utilization 1130 in the event item column, the level "warning" is used when the disk utilization exceeds 75%; the level "critical" is used when it exceeds 85%; and the level "fatal" is used when it exceeds 90%. In other words, these levels represent severities of events in individual system resources and are used as indices by a system administrator in understanding the state of the object being monitored. The example event console of the type that gives a display as shown in FIG. 10 is defined to be a "basic type."

The important level of an event displayed on the above "basic type" event console, however, is defined in a manner that allows a system administrator to easily manage the distributed system and does not indicate the effect the event has on important business operations as seen by the corporation. Therefore, when two or more events occur simultaneously, there is a fear that if the administrator deals with these events according to the importance or urgency levels described above, it may not be possible to minimize losses in business.

An effort is being made in recent years to introduce a business point of view in the management of a distributed system. The management method for a distributed system involves defining in advance a relationship between business operations executed on the distributed system and computer equipment (simply referred to as resources) that make up the business operation, such as servers, storage devices, network devices, business applications and databases and, when a failure occurs with a certain resource, displaying on the event console which business operation may be affected by that failure.

Figure 12:
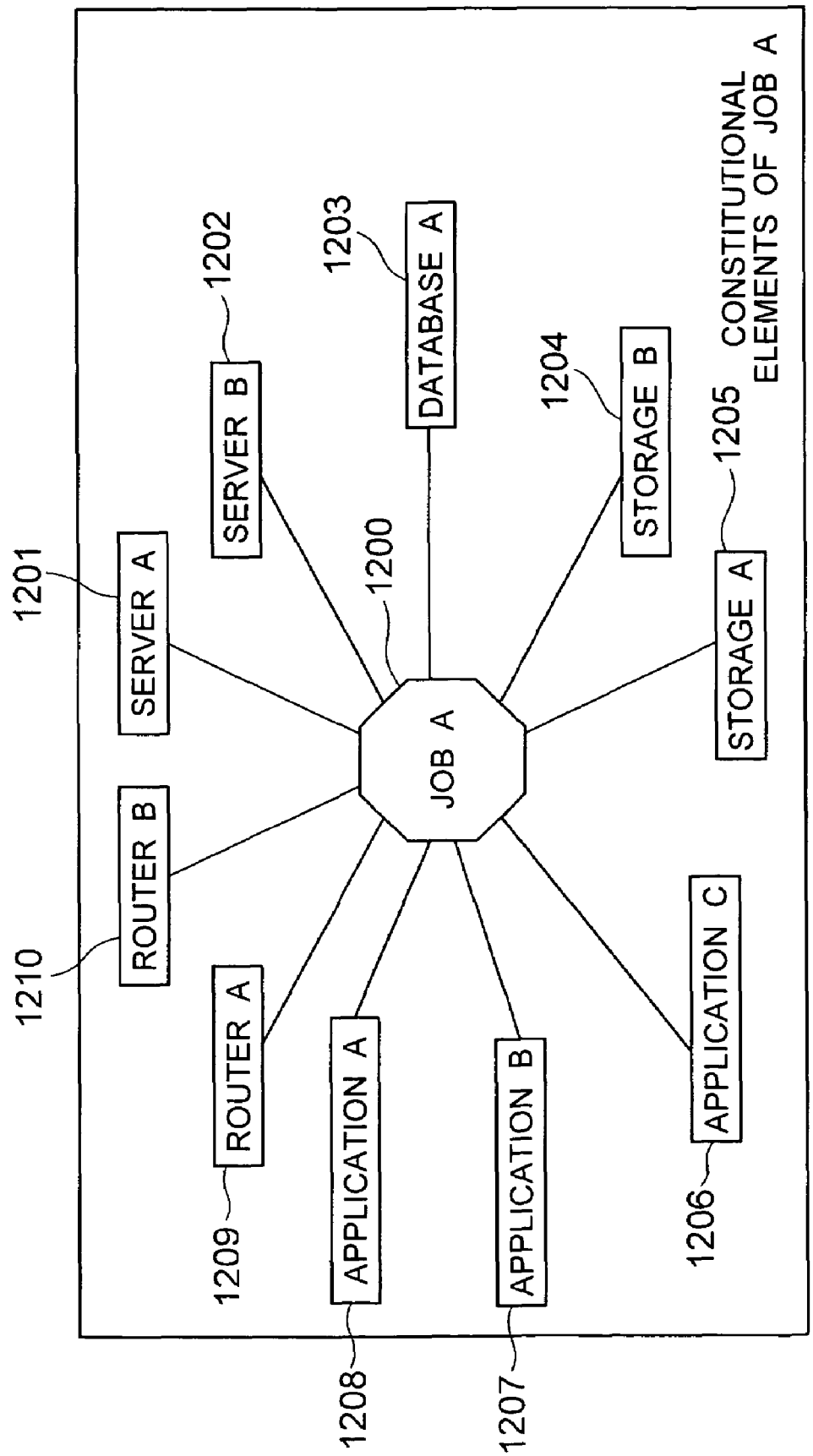
FIG. 12 illustrates an example definition of relation between a job and resources which the inventor has considered.
Figure 13:
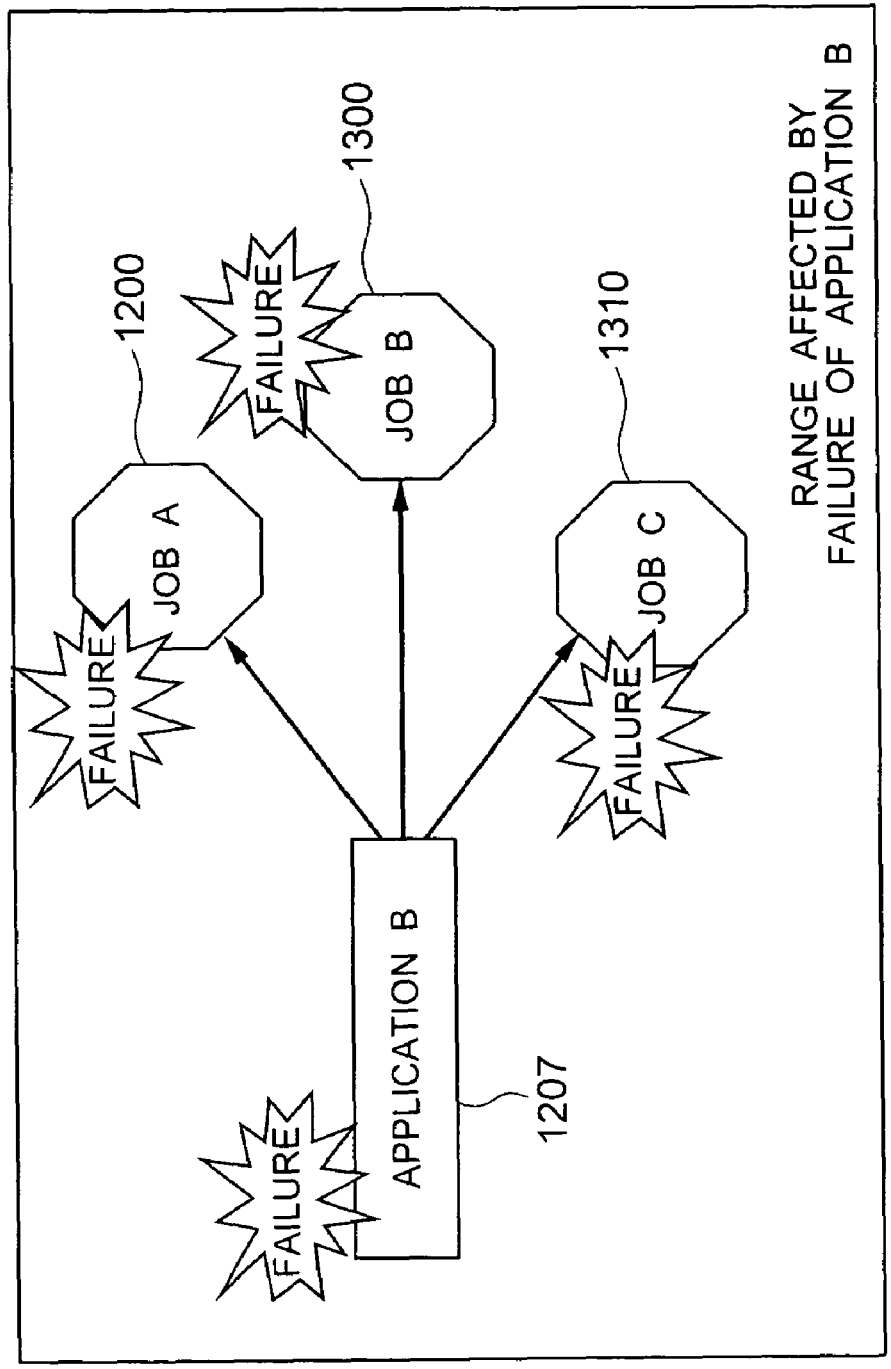
FIG. 13 illustrates an example display on the event console showing which jobs will be affected by a resource failure during the inventor's consideration prior to achieving the invention.

FIG. 12 illustrates an example relation between a business operation or job and resources which the present inventor has considered prior to this invention. FIG. 13 illustrates an example display on the event console showing which resource failure will affect which job.

The example relation between the business operations or jobs and the resources in FIG. 12 shows that a job A is executed by a system comprising a total of 10 resources, including servers 1201, 1202, database A 1203, storages 1204, 1205, applications 1206-1208 and routers 1209, 1210. Such a definition is prepared for each job. An example shown in FIG. 13 indicates which jobs will be affected by a failure in the resources of FIG. 12. This example shows that a failure of application B 1207 may result in failures of job A 1200, job B 1300 and job C 1310, all of which have the application as their constituent. An event console that gives a display such as shown in FIG. 13 is defined to be a "failure influence type."

The display shown on the "failure influence type" event console of FIG. 13 is a representation of the display of the "basic type" event console from more of a business point of view and makes it possible to determine which job a failure of a certain resource will affect. However, it cannot determine which job is important to the corporation. Normally a system administrator does not have a precise knowledge about the importance of individual jobs executed on a distributed system. Thus, in the event of a multiple failures, the system administrator, if he or she uses the "failure influence type" event console, cannot determine a priority order himself in which to deal with the failures unless he finds out which jobs will be affected by the failures and checks with a management or a person responsible for the jobs which of these jobs is currently important. As a result, time is wasted before appropriate steps can be taken, widening business losses.

A method and apparatus for managing a distributed system according to this invention will be described by referring to the accompanying drawings.

FIG. 1 shows an example display formed on the event console by the distributed system management method according to one embodiment of this invention.

While this embodiment that follows uses an event console of the type that displays an event message as shown in FIG. 1, this invention may also use other types of event console, for example, those which display jobs and resources in a tree structure using icons to enable failures or events in an entire system to be monitored on a GUI (graphical user interface).

This embodiment can provide a display of FIG. 1 instead of the conventional event console display such as shown in FIG. 10. FIG. 1 illustrates an example display on an event console which uses the monitored state of FIG. 10 as it is and adds to it job importance levels provided by this invention. Information displayed here is made up of records, each of which has, for each event, a job importance level 100, a time of a failure as event 101, and an event message 102 representing a content of the event. The job importance level 100 is indicated in the form of A, B, C, . . . and ranked such as A>B>C> . . . Although this representation does not indicate a name of job that will be affected by the failure or event being considered, it is possible to add a name of job that may be affected by the event on the display as required.

As is apparent from comparison between the same events shown in FIG. 10 and in FIG. 1, an event 1022 that "memory utilization of a server 08 exceeded 95%", which is displayed as "fatal" 1020 in the example of FIG. 10, is evaluated as "C" in terms of job importance level in the case of this embodiment shown in FIG. 1. This means that the "server 08" failure that was logged as the event 1022 is a failure of a server that is not used in an important job although it is grave in terms of resource failure. Thus, from a standpoint of minimizing effects on business, this event 1022 is not necessarily a failure that needs as urgent a response as indicated in FIG. 10.

Similarly, an event 1032 that "response of application 03 degraded," which is only at a "warning" level 1030 in FIG. 10, is displayed as "A" in FIG. 1 indicating it is a very important event. This means that the "application 03," which has been reported in event 1032 as being degraded in response, is used in an important job and therefore is an important event that must not be overlooked when considering the effects it will have on business although it is not a grave failure in terms of a resource failure. If a distributed system administrator follows the importance level displayed on the event console of FIG. 10 and takes action first with the event 1022 which is displayed as "fatal," instead of the event 1032 which is shown as "warning," it can widen losses in business.

As described above, the display on the event console according to the distributed system management method of this embodiment can precisely present to the system administrator a serious failure from a business point of view which may go undetected from information displayed on the prior art event console. As a result, the system administrator can use the job importance level along with the event message as decision criteria in dealing with failures or events and thus minimize losses resulting from the halt of the job due to the event.

FIG. 2 is a block diagram showing a configuration of a distributed system that applies the distributed system management method according to one embodiment of this invention. In FIG. 2, denoted 200 is an integrated management unit, 201 an event display unit, 202 an event management unit, 203 an event database, 210 a job influence management unit, 211 a relation defining unit, 212 a job definition database, 220 an importance level management unit, 221 an importance level data management unit, 222 a rule table management unit, 223 a table data retrieving unit, 224 a job importance level database, 250, 260 and 270 job servers A-C, 251, 261 and 271 agents, and 252, 262 and 272 databases.

The distributed system shown in FIG. 2 is made up of the integrated management unit 200, the job influence management unit 210, the importance level management unit 220, and the job server group of a plurality of job servers that execute jobs and are being monitored, all these units being interconnected via a network not shown. The job server group has a plurality of job servers, such as a job server A 250, a job server B 260 and a job server C 270. The job servers may use one computer for each job or a plurality of jobs may reside in a single computer. The integrated management unit 200, the job influence management unit 210 and the importance level management unit 220 may each be installed in one of different computers or they may be installed in one and the same computer. Further, though not shown in FIG. 2, a variety of peripheral devices may be connected to the network not shown.

The conventional event console of the "basic type" comprises the job server group and the integrated management unit 200, while the event console of the "failure influence type" has the job influence management unit 210 added to the configuration of the "basic type" event console.

The job servers 250, 260, 270 making up the job server group being monitored have agents 251, 261, 271 to monitor these job servers and also databases 252, 262, 272 to store data generated by the job servers.

The integrated management unit 200 comprises the event display unit 201, the event management unit 202 and the event database 203. The event display unit 201 displays information held in the event management unit 202 on the event console not shown. The event management unit 202 receives events from the agents 251, 261, 271 in the job servers 250, 260, 270, performs necessary processing on the events, such as filtering unwanted events and grouping related events, and store the events in the event database 203 as needed. The event display unit 201 and the event management unit 202 may reside in separate computers and be connected with each other via network.

The job influence management unit 210 comprises the relation defining unit 211 and the job definition database 212. The relation defining unit 211, as described before with reference to FIG. 12, manages as definition information the relation between jobs executed on the distributed system and the resources making up the jobs and stores the definition information in the job definition database 212. The relation defining unit 211, in response to a query from the event management unit 202 in the integrated management unit 200, returns a name list of jobs which have as constitutional elements the resources in which the received event occurred.

The importance level management unit 220 prepares and manages the job importance levels of jobs defined by the job influence management unit 210 and comprises the importance level data management unit 221, the rule table management unit 222, the table data retrieving unit 223 and the job importance level database 224. The importance level data management unit 221, in response to a request from the event management unit 202 in the integrated management unit 200, refers to the job importance level database 224 for the job which may be influenced by the event in question and provides the importance level of the job to the event management unit 202. When there are a plurality of jobs that will be affected by the event, their importance levels are compared and the job with the highest level is returned to the event management unit 202.

The importance level data management unit 221 also prepares job importance level data and stores them in the job importance level database 224. If the job importance level changes with factors such as time and date, the job importance level data is repetitively updated at predetermined intervals to keep the data in the job importance level database 224 up to date. The rule table management unit 222 manages rules and evaluation formulas used to prepare the job importance levels described later and actually calculates the job importance levels. The table data retrieving unit 223 retrieves from the databases 252, 262, 272 in the job servers 250, 260, 270 input parameter data when the rule table management unit 222 calculates the job importance level data.

Next, the process of calculating the job importance level data by the importance level management unit 220 will be explained in detail.

FIG. 3 shows an example of job importance level data stored in the job importance level database 224. FIG. 4 shows an example of rule table defining table, FIG. 5 shows an example of rule tables, FIG. 6 shows a table of locations where latest variables are stored, and FIG. 7 shows formulas defining job importance levels.

The job importance level database 224 stores job importance level data such as shown in FIG. 3. The job importance level database 224 is made up of two items: job name 300 and job importance level 301. The job name 300 represents names of jobs executed on the distributed system, for example, "Internet sales site A" 310 and "Product A production control system" 325. These must be the same as the job names managed by the job definition database 212 in the job influence management unit 210. While FIG. 3 takes up 10 different jobs as an example case, the number of jobs does not matter. The job importance level 301 represents the importance level of the corresponding job which is indicated as A, B, C, . . . and ranked in the form of A>B>C> . . . In the example of FIG. 3, the job importance level of the "Internet sales site A" 310 is "A" 311, which means the job is an important one.

The job importance level 301 is calculated in a procedure described below and the calculated result is stored in this column.

The job importance level 301 is determined by using a plurality of tables shown in FIG. 4 to FIG. 6 and the job importance level evaluation formulas shown in FIG. 7. The rule table defining table of FIG. 4 holds data used to manage one or more rule tables shown in FIG. 5. In FIG. 4, a job name 400 represents names of jobs and a table No. 401 represents a rule table number from among rule tables of FIG. 5 which includes the job of interest. An evaluation item number 402 represents the number of evaluation items necessary in calculating the importance level of the job under consideration. For example, this rule table defining table indicates that the job "Internet sales site A" 310 is defined in the "first" rule table (411) and that it has "three" evaluation items (412).

The rule tables shown in FIG. 5 present a list of evaluation items necessary in determining the importance level of each job. Since not all jobs can be evaluated for their importance level based on the same evaluation items, jobs are classified into groups in each of which the jobs can be defined with the same evaluation items. And each of these groups is assigned a rule table. FIG. 5 illustrates three tables named <table 1> 411, <table 2> 421 and <table 3> 431.

The job name 500 in <table 1> 411 represents the names of jobs defined in table 1. "Average monthly sales (yen) <P11>" 501, "campaign period <P12>" 502 and "sales rate during period (%) <P13>" 503 are item names in table 1 that affect the job importance level. P11, P12 and P13 are variables of job importance level whose values are data given in the table. The job name "Internet sales site A" 310 has its importance level defined by the three evaluation items: "average monthly sales" 501, "campaign period" 502 and "sales rate during period" 503, and their values are "50,000,000" 511, "12/1-12/24" 512 and "30" 513. These values are provided in advance by the user of the distributed system.

Jobs included in <table 2> 421 have their importance level defined by two evaluation items: "number of stored goods (pieces) <P21>" 541 and "minimum number of stored goods (pieces) <P22>" 542. Job name "product A production control system" 325 has "var_1" 551 in the "number of stored goods" 541 and "10" 552 in the "minimum number of stored goods" 542. Here, "var_1" 551 is given not as a fixed value but as a variable and a location of its latest data is provided in FIG. 6 described later. "var_2" 561 and "var_3" 571 are similarly given as variables. In this way the rule tables are allowed to use variables, which may be used where the item changes with time and date.

Where variables are used in the rule tables described above, storage locations of the latest data needs to be specified in advance as shown in FIG. 6. In FIG. 6, a variable name 600 represents names of variables used in the rule tables of FIG. 5 and a data location 601 specifies, as by paths, locations on the distributed system where the data are stored. The example of FIG. 6 shows that the value of "var_1" 551 is stored in a database at a location specified by a path "server_K¥seisan¥seihin_A.db."

The job importance level can be determined by using the definition formulas (1)-(3) in FIG. 7. For example, a job importance level F1 for the jobs included in table 1 of FIG. 5 can be calculated by formula (1) of FIG. 7 using data P11, P12, P13 in table 1. Similarly, a job importance level F2 for the jobs included in table 2 of FIG. 5 can be calculated by formula (2) using data P21, P22. A job importance level F3 for the jobs included in table 3 of FIG. 5 can be determined by formula (3) using data P31, P32. The job importance level of each job shown in FIG. 3 is determined by contemplating in FIG. 5 the date to be February 20 (Thursday) and values of var_1, var_2 and var_3 to be 13, 18 and 30 respectively and applying them to the evaluation formulas of FIG. 7.

Since the jobs included in rule tables 1, 3 of FIG. 5 depend on the date and the day of week in the determination of their job importance level, the job importance level data must be updated each time date changes and thus the job importance level is calculated whenever the date changes.

FIG. 8 illustrates a sequence of processing executed in the above embodiment of this invention from the occurrence of an event in a business server to the displaying of the event along with the job importance level. This is detailed as follows.

(1) When an event, such as an insufficient resource, takes place in a local job server, the agent 251, 261, 271 in the job server 250, 260, 270 sends the event messagae and resource information to the integrated management unit 200. The event management unit 202 in the integrated management unit 200 receives these information (sequence (1)).

(2) The event management unit 202 in the integrated management unit 200 sends the resource information to the relation defining unit 211 of the job influence management unit 210 that manages the relations between jobs and resources, in order to query about the jobs that will be affected (sequence (2)).

(3) In response to the query in sequence (2) about the affected jobs, the relation defining unit 211 of the job influence management unit 210 sends back to the event management unit 202 as the affected job information a name list of jobs that have as a constituent the resource in which the received event took place. This information is received by the event management unit 202 (sequence (3)).

(4) The event management unit 202 of the integrated management unit 200 refers to the importance level data management unit 221 of the importance level management unit 220 about the importance levels of the jobs received in sequence (3) (sequence (4)).

(5) In response to the query in sequence (4), the importance level data management unit 221 of the importance level management unit 220 sends the job importance level data to the event management unit 202. The event management unit 202 receives this data (sequence (5)).

(6) Then, the integrated management unit 200 sends the job importance level received in sequence (5) and the corresponding event to the event display unit 201 which displays these information.

Figure 9:
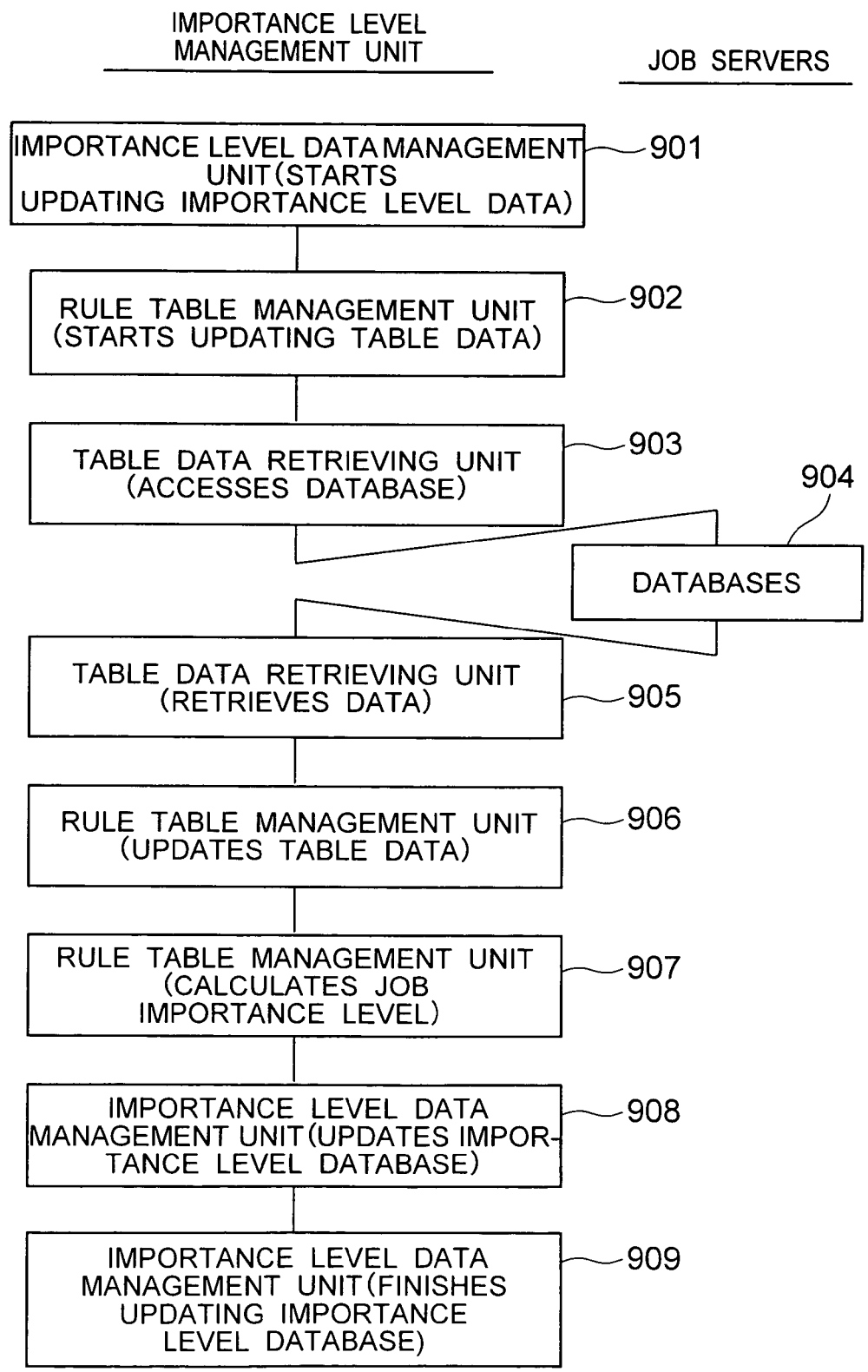
FIG. 9 is a flow chart showing processing executed by an importance level data management unit in an importance level management unit to update data in a job importance level database.

FIG. 9 is a flow chart showing a process by which the importance level data management unit 221 of the importance level management unit 220 updates data in the job importance level database 224. This process is detailed as follows.

(1) Before the importance level data management unit 221 of the importance level management unit 220 starts updating the job importance level data, the rule table management unit 222 begins updating the table data used in calculating the importance level (step 901, 902).

(2) The table data retrieving unit 223 checks information on the locations of variables in the rule tables required for the calculation of importance level and accesses the database of the specified job server (step 903).

(3) The database of the job server returns variable data in response to the access in step 903. The table data retrieving unit 223 receives the response data (step 904, 905).

(4) The rule table management unit 222 uses the variable data retrieved by the table data retrieving unit 223 in step 905 to update the table data (step 906).

(5) The rule table management unit 222 uses the updated table data to calculate the job importance level (step 907).

(6) The importance level data management unit 221 stores in the job importance level database the job importance level data calculated by the rule table management unit 222 in step 907 (step 908, 909).

The steps in the above process of this embodiment may be configured as individual programs which may be provided in the form of such storage media as HD, DAT, FD, MO, DVD-ROM and CD-ROM.

The above embodiment has been described to calculate the job importance levels shown in FIG. 3 by using a plurality of tables shown in FIGS. 4-6 and the job importance level evaluation formulas of FIG. 7. If the job importance level is obvious and does not require the calculation or if the rule tables do not include variable data and the job importance level evaluation formulas do not include variables such as date, this invention may use predetermined data as the job importance level of FIG. 3.

In that case, the importance level of the job "Internet sales site A" 310 in FIG. 3 does not require the calculation by the job importance level calculation process and can be taken as "A." If the job importance levels for all the jobs in FIG. 3 can be provided beforehand, it is possible to use predetermined data in FIG. 3 so that the request from the event management unit 202 can be met simply by returning the corresponding job importance level. Here, the rule table management unit 222 and the table data retrieving unit 223 shown in FIG. 2 are not necessary.

In this invention, it is also possible to calculate the importance levels of some of the jobs shown in FIG. 3 by using a plurality of tables shown in FIGS. 4-6 and the job importance level evaluation formula shown in FIG. 7 and to determine the importance levels of the remaining jobs from the predetermined data.

For example, in the rule table of FIG. 5, since a focused period 581 of table 3 (431) includes variable data such as date and the day of week, the importance levels of the jobs defined in table 3 cannot be provided in the form of predetermined data. However, if the jobs included in table 3 are such that their importance levels are determined only by a confidence loss percentage 582 irrespective of the focused period 581, the importance levels of the four jobs defined in table 3 can be provided in the form of predetermined data. In this case, for only the four jobs "Web site for customers" 340, "Web site for employees" 345, "work day/holiday management system" 350 and "salary calculation system" 355 shown in FIG. 3, their importance levels may be provided in the form of predetermined data in FIG. 3. When the importance levels of the remaining six jobs need to be determined, their importance levels may be calculated from the tables and evaluation formulas shown in FIGS. 4-7.

Further, the distributed system management method of the above embodiment of this invention which calculates the job service importance levels shown in FIG. 3 by using a plurality of tables shown in FIGS. 4-6 and the job importance level evaluation formulas shown in FIG. 7 can be applied, for instance, to service providers that provide distributed system management services.

Among services offered by the service providers there is one which promises users that troubles or events will be dealt with on a priority basis using job importance levels and which adopts a service fee system that charges higher fees to those users executing jobs with higher importance levels. With this invention, it is also possible to provide a service which uses the job importance level as an evaluation item of SLA (service level agreement), for example, by reporting every month the time it took to deal with troubles for each job importance level and making arrangements so that the total time spent every month tackling troubles with those jobs having job importance level A is less than one hour.

Unlike the conventional event console that displays an importance level of a trouble as seen from the system management point of view, the above embodiment of this invention can present an importance level of job according to how important the job which will be affected by that trouble is to business. As a result, a system administrator can deal with the trouble by taking the job importance level is displayed along with an event message as decision criteria, thus minimizing losses caused by a halt of the job resulting from the trouble in the distributed system.

As described above, this invention presents to a system administrator how important a job affected by a trouble in the distributed system is to business and thereby allows the system administrator to manage the distributed system by considering the effects that the system trouble has on business.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system management method in a system management apparatus for a distributed computing system having a plurality of computers, said system management method comprising:

providing relations between a job and a job importance level of the job, for ones of jobs handled by the distributed computing system;

in response to an abnormal-condition event, receiving abnormal-condition event information and resource information relating to said abnormal-condition event information from said distributed computing system; and in response to the abnormal-condition event information and resource information, extracting a relation between said abnormal-condition event and importance level of the abnormal-condition event, from said relations between said job and said job importance level, and displaying information on the abnormal-condition event and information on said job importance level of at least one job associated with the abnormal-condition event.

2. A system management method according to claim 1, wherein said information on said job importance level information is a business-loss job importance level which considers business losses and is calculated according to predetermined rules.

3. A system management method according to claim 2, wherein, if data necessary to calculate the job importance level includes variables, the calculation of the job importance level according to the predetermined rules is performed each time the variables are updated.

4. A system management method according to claim 1, wherein said job importance level is held as predetermined data.

5. A system management method according to claim 1, wherein said job importance level is held as predetermined data for some jobs and, for other jobs, is a business-loss job importance level which considers business losses and is calculated according to the predetermined rules.

6. A system management method according to claim 1, wherein each said job includes an application, service and/or batch job provided on at least one computer in the distributed computing system.

7. A system management apparatus for a distributed computing system having a plurality of computers, comprising:

a relations unit stored with information to provide relations between a job and a job importance level of the job, for ones of jobs handled by the distributed computing system;

an integrated management unit to receive, in response to an abnormal-condition event, abnormal-condition event information and resource information relating to said abnormal-condition event information from said distributed computing system; and an importance level management unit to extract, in response to the abnormal-condition event information and resource information, a relation between said abnormal-condition event and importance level of the abnormal-condition event, from said relations between said job and said job importance level, and displaying information on the abnormal-condition event and information on said job importance level of at least one job associated with the abnormal-condition event.

8. A system management apparatus according to claim 7, wherein said job importance level is a business-loss importance level which considers business losses and is calculated according to specified rules.

9. A system management apparatus according to claim 8, wherein, if data necessary to calculate the job importance level includes variables, the calculation of the job importance level according to the predetermined rules is performed each time the variables are updated.

10. A system management apparatus according to claim 7, wherein said job importance level is held as predetermined data.

11. A system management apparatus according to claim 7, wherein said job importance level held as predetermined data for some jobs and, for other jobs, is a business-loss job importance level which considers business losses and is calculated according to the predetermined rules.

12. A system management apparatus according to claim 7, wherein each said job includes an application, service and/or batch job provided on at least one computer in the distributed computing system.

13. A computer-readable medium having a program embedded thereon for managing a distributed computing system having a plurality of computers, the program, when executed, causing operations comprising:

providing relations between a job and a job importance level of the job, for ones of jobs handled by the distributed computing system;

in response to an abnormal-condition event, receiving abnormal-condition event information and resource information relating to said abnormal-condition event information from said distributed computing system; and in response to the abnormal-condition event information and resource information, extracting a relation between said abnormal-condition event and importance level of the abnormal-condition event, from said relations between said job and said job importance level, and displaying information on the abnormal-condition event and information on said job importance level of at least one job associated with the abnormal-condition event.

14. A medium according to claim 13, wherein said job importance level a business-loss job importance level which considers business losses and is calculated according to specified rules.

15. A medium according to claim 14, wherein, if data necessary to calculate the job importance level includes variables, the calculation of the job importance level according to the predetermined rules is performed each time the variables are updated.

16. A medium according to claim 13, wherein said job importance level is held as predetermined data.

17. A medium according to claim 13, wherein said job importance level is held as predetermined data for some jobs and, for other jobs, is a business-loss job importance level which considers business losses and is calculated according to the predetermined rules.

18. A medium according to claim 13, wherein each said job includes an application, service and/or batch job provided on at least one computer in the distributed computing system.

19. A computer for managing a distributed computing system having a plurality of computers, comprising:

means for providing relations between a job and a job importance level of the job, for ones of jobs handled by the distributed computing system;

means for receiving, in response to an abnormal-condition event, abnormal-condition event information and resource information relating to said abnormal condition event information from said distributed computing system; and means for extracting, in response to the abnormal-condition event information and resource information, a relation between said abnormal-condition event and importance level of the abnormal-condition event, from said relations between said job and said job importance level, and displaying information on the abnormal-condition event and information on said job importance level of at least one job associated with the abnormal-condition event.

20. A computer according to claim 19, wherein said job importance level is a business-loss job importance level which considers business losses and is calculated according to specified rules.

21. A computer according to claim 20, wherein, if data necessary to calculate the job importance level includes variables, the calculation of the job importance level according to the predetermined rules is performed each time the variables are updated.

22. A computer according to claim 19, wherein said job importance level is held as predetermined data.

23. A computer according to claim 19, wherein said job importance level is held as predetermined data for some jobs and, for other jobs, is a business-loss job importance level which considers business losses and is calculated according to the predetermined rules.

24. A computer according to claim 19, wherein each said job includes an application, service and/or batch job provided on at least one computer in the distributed computing system.

* * * * *